United States Patent
Gurunath et al.

(10) Patent No.: US 12,235,794 B1
(45) Date of Patent: Feb. 25, 2025

(54) SMART RESOURCE EFFICIENT SNAPSHOT RULE BASED ON UNIQUE DATA TRACKING

(71) Applicant: Dell Products L.P., Round Rock, TX (US)

(72) Inventors: Adithi Gurunath, Bangalore (IN); Rosh Mohan Ravi, Bengaluru (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/366,276

(22) Filed: Aug. 7, 2023

(51) Int. Cl.
  G06F 7/00 (2006.01)
  G06F 16/11 (2019.01)
  G06F 16/182 (2019.01)
  G06F 17/00 (2019.01)

(52) U.S. Cl.
  CPC .......... G06F 16/125 (2019.01); G06F 16/128 (2019.01); G06F 16/1844 (2019.01)

(58) Field of Classification Search
  None
  See application file for complete search history.

(56) References Cited

U.S. PATENT DOCUMENTS

| | | | | |
|---|---|---|---|---|
| 2007/0288490 | A1* | 12/2007 | Longshaw | G06F 16/217 |
| 2022/0334927 | A1* | 10/2022 | Haravu | G06F 11/1451 |
| 2022/0398217 | A1* | 12/2022 | McColgan | G06F 11/1461 |

* cited by examiner

Primary Examiner — Tuan A Pham
(74) Attorney, Agent, or Firm — Amin, Turocy & Watson, LLP

(57) ABSTRACT

A system can comprise a processor and a memory that can store executable instructions that, when executed by the processor, facilitate performance of operations comprising attaching a protection policy associated with a rule to a storage object, wherein the rule can be applicable to prevent redundant snapshot creation. The operations can further comprise, in response to the attaching of the protection policy to the storage object, triggering creation of a first snapshot and a second snapshot of the storage object. The operations can further comprise detecting any uniquely allocated storage regions between the first snapshot and the second snapshot. The operations can further comprise, based on a determination of whether any extra bits of the any uniquely allocated storage regions are unallocated or zeroed out, determining whether to prevent a third creation of a third snapshot external to the first snapshot and the second snapshot.

20 Claims, 10 Drawing Sheets

REST Request:
https://10.245.149.21/api/rest/volume/0185b55c-4726-40fc-8ea6-71c048e914fe/compute_differences
{
    "base_snapshot_id": "43213872-9a1e-4004-9cb9-dab2f728ace4",
    "offset": 0,
    "length": 4194304,
    "chunk_size": 1048576
}

REST Response:
{
    "chunk_bitmap": "AQ==",
    "next_offset": 62914560
} chunk_bitmap: AQ== (Base64 encoded)
Base64 decoded value in binary: 0000 0001
Result bitmap with bits in each byte reordered: 1000 0000

FIG. 4

SMART RESOURCE EFFICIENT SNAPSHOT RULE BASED ON UNIQUE DATA TRACKING

BACKGROUND

A computing system can be snapshotted at defined time intervals either manually or based on a protection policy with a snapshot creation rule.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

According to an embodiment, a system is provided. The system can comprise a processor and a memory that can store executable instructions that, when executed by the processor, facilitate performance of operations comprising attaching, by a policy manager of the system, a protection policy associated with a rule to a storage object, wherein the rule can be applicable to prevent redundant snapshot creation. The operations can further comprise, in response to the attaching of the protection policy to the storage object, triggering, by the policy manager, a first creation of a first snapshot of the storage object, and triggering, by the policy manager, a second creation of a second snapshot from the first snapshot, wherein the first snapshot and the second snapshot can comprise identical snapshot information. The operations can further comprise detecting, by a core logical engine of the system, any uniquely allocated storage regions between the first snapshot and the second snapshot. The operations can further comprise, based on a determination of whether any extra bits of the any uniquely allocated storage regions are unallocated or zeroed out, determining whether to prevent a third creation of a third snapshot external to the first snapshot and the second snapshot.

According to an embodiment, a method is provided. The method can comprise attaching, by a system comprising a processor, a protection policy associated with a rule to a storage object, wherein the rule can be applicable to prevent redundant snapshot creation. The method can further comprise, in response to the attaching of the protection policy to the storage object, triggering, by the system, a first creation of a first snapshot of the storage object, and triggering a second creation of a second snapshot from the first snapshot, wherein the first snapshot and the second snapshot can comprise identical snapshot information. The method can further comprise detecting, by the system, any uniquely allocated storage regions between the first snapshot and the second snapshot. The method can further comprise based on a determination of whether any extra bits of the any uniquely allocated storage regions are unallocated or zeroed out, determining, by the system, whether to prevent a third creation of a third snapshot external to the first snapshot and the second snapshot, wherein the third snapshot can be reflected via a user device.

According to yet another embodiment, a non-transitory machine-readable medium is provided. The non-transitory machine-readable medium can comprise executable instructions that, when executed by a processor, facilitate performance of operations comprising attaching a protection policy associated with a rule to a storage object, wherein the rule can be applicable to prevent redundant snapshot creation. The operations can further comprise, in response to the attaching of the protection policy to the storage object, initiating a first creation of a first snapshot of the storage object, and initiating a second creation of a second snapshot from the first snapshot, wherein the first snapshot and the second snapshot can comprise identical snapshot information. The operations can further comprise detecting any uniquely allocated storage regions between the first snapshot and the second snapshot. The operations can further comprise, based on a determination of whether any extra bits of the any uniquely allocated storage regions are unallocated or zeroed out, determining whether to create a third snapshot of the storage object.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates an example, non-limiting code related to a snapDiff application programming interface (API) request and response in accordance with one or more embodiments described herein.

DETAILED DESCRIPTION

Figure 1:
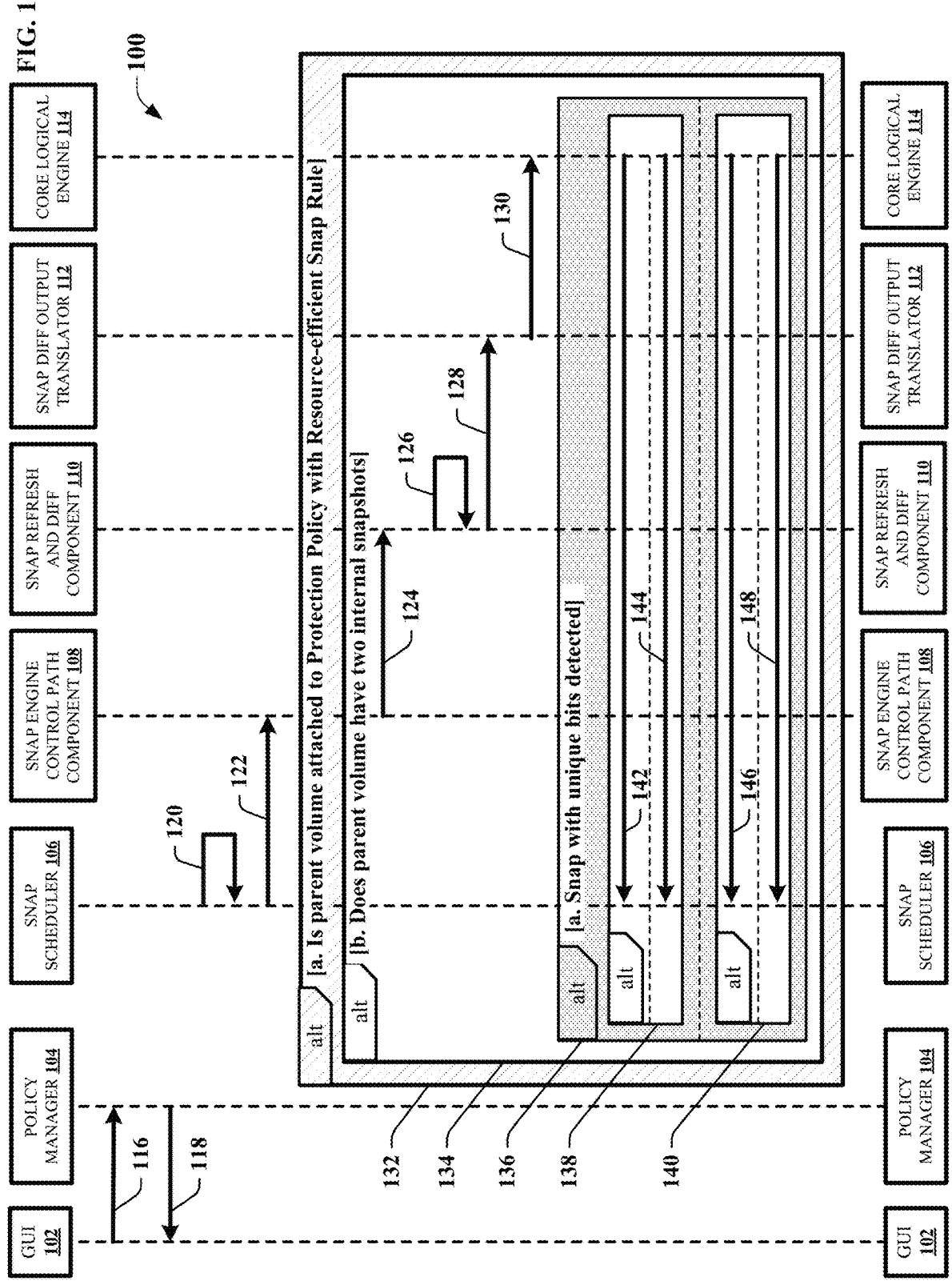
FIG. 1 illustrates example, non-limiting components of a system and a corresponding workflow that can determine whether to prevent creation of a snapshot in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. In other instances, well-known structures and devices are shown in block diagram form in order to facilitate describing the subject disclosure.

The subject disclosure relates to snapshots and, more specifically, to smart resource efficient snapshot rules based on a unique data tracking process.

In this regard, existing techniques for snapshot creation involve creation of snapshots by attaching a protection policy to a storage object with a snapshot rule or by manually creating a snapshot. Existing snapshot rules for creation of snapshots can involve a time-based approach wherein a user can specify a time of the day, days of a week, a time interval in a minimum granularity of minutes, etc. for creation of a snapshot, and a value for a frequency of snapshot creation (e.g., every hour, every two days, etc.) can be different across different platforms. There can be times when a snapshot schedule can be aggressive, which can result in frequent snapshots being created even with unmodified data. For example, once a user associates a storage object to a protection policy with a snapshot rule without any intrusions, a system can generate snapshots without stopping, in a robotic manner. For example, an aggressive snapshot schedule of 5 minutes or less in case of no change to data or no inputs/outputs (IOs) can lead to redundant snapshots. Further, a user can place a prolonged retention policy for snapshots that do not have any difference or unique data, which can lead to inefficient utilization of computing resources. For example, a system can have a limited amount of resources (e.g., a capacity of 10,000 snapshots), and the system resources can be continuously utilized.

Existing snapshot technologies do not provide any way to determine whether any changes to a volume have occurred since a previous snapshot, and multiple identical snapshots can be generated with no change to the data, thereby increasing snapshot resource consumption along with metadata space. Further still, existing snapshot technologies can neither provide methods to determine snapshots that can point to unallocated data or zeros, nor any reporting facilities for snapshots categorized as relating to changes to the volume or relating to unallocated data/zeros.

Various embodiments of the subject innovation can address these issues by identifying redundant snapshots, taking actions or suggesting actions on the redundant snapshots based on a policy rule attribute, for example, by enabling, based on the policy rule attribute, a reporting facility for a customer or end user, wherein the reporting facility can identify a category of a snapshot (e.g., relating to changes to a volume or relating to unallocated data/zeros) and suggest actions on the snapshot. Embodiments described herein include systems, methods, apparatus and computer program products that can provide an enhancement over existing time-based snapshot creation policy approaches, wherein addition of smart resource efficient unique data tracking processes can create or retain snapshots based on change in data that can be more resource efficient and save metadata space. For example, in an embodiment, a protection policy associated with a snapshot rule can be attached to storage objects comprising a volume, file system, etc. for a scheduled snapshot creation. The snapshot rule can be enhanced to be a resource efficient rule that can provide a user with two choices, namely, enabling resource efficiency reporting and controlling snapshot creation based on resource efficiency.

Controlling the snapshot creation based on resource efficiency can prevent creation of redundant snapshots using a defined process, resulting in only unique snapshots being retained. Upon a resource efficiency reporting attribute being enabled by a user or an entity, a logic introduced by the one or more embodiments discussed herein can provide the user or the entity with reporting for storage objects on which a policy with a snap rule is attached (i.e., reporting about snapshots created under a protection policy with a resource efficient snapshot rule). The resource efficiency reporting can point the user or the entity to redundant snapshots associated to the storage objects.

The resource efficiency reporting can appear as Snap 1→Snap 2 (Redundant), Snap 3 (Redundant), Snap 4 (Redundant), wherein "Snap 1" can be an oldest snapshot and "Snap 4" can be a latest snapshot. The resource efficiency reporting can assist the user or the entity to identify redundant snapshots and take desirable or necessary actions (e.g., manually). For example, based on the resource efficiency reporting, the user or the entity can choose to delete the redundant snapshots. The resource efficiency reporting can reflect an updated scenario if the user or the entity refreshes or deletes a snapshot. Upon a control snapshot based on resource efficiency attribute being enabled by the user or the entity, the logic introduced by the one or more embodiments discussed herein can be capable of preventing creation of redundant snapshots (i.e., preventing creation of snapshots when there are no writes to a volume).

Various embodiments herein can provide a technology that can enable efficient snapshot and metadata space consumption, leading to optimized metadata storage space, performance and snapshot resources. As such, the one or more embodiments can be employed in industries and technologies related to storage platforms.

The embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting system 100 as illustrated at FIG. 1, and/or systems thereof, can further comprise, be associated with and/or be coupled to one or more computer and/or computing-based elements described herein with reference to an operating environment, such as the operating environment 1000 illustrated at FIG. 10. For example, system 100 can be associated with, such as accessible via, a computing environment 1000 described below with reference to FIG. 10, such that aspects of processing can be distributed between system 100 and the computing environment 1000. In one or more described embodiments, computer and/or computing-based elements can be used in connection with implementing one or more of the systems, devices, components and/or computer-implemented operations shown and/or described in connection with FIG. 1 and/or with other figures described herein.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 illustrates example, non-limiting components of a system 100 and a corresponding workflow that can determine whether to prevent creation of a snapshot in accordance with one or more embodiments described herein. System 100 can be a resource efficient snap engine. System 100 can comprise a processor, a memory, and a system bus (not illustrated in FIG. 1). System 100 can additionally comprise graphical user interface (GUI) 102, policy manager 104, snap scheduler 106, snap engine control path component 108, snap refresh and diff component 110, snap diff output translator 112 and core logical engine 114.

Discussion turns briefly to the processor, the memory and the bus of system 100. For example, in one or more embodiments, the system 100 can comprise a processor (e.g., computer processing unit, microprocessor, classical processor, and/or like processor). In one or more embodiments, a component associated with system 100, as described herein with or without reference to the one or more figures of the one or more embodiments, can comprise one or more computer and/or machine readable, writable and/or executable components and/or instructions that can be executed by the processor to enable performance of one or more processes defined by such component(s) and/or instruction(s).

In one or more embodiments, system 100 can comprise a computer-readable memory (e.g., memory) that can be operably connected to the processor. The memory can store computer-executable instructions that, upon execution by the processor, can cause the processor and/or one or more other components of system 100 to perform one or more actions. In one or more embodiments, the memory can store computer-executable components.

System 100 and/or a component thereof as described herein, can be communicatively, electrically, operatively, optically and/or otherwise coupled to one another via a bus. The bus can comprise one or more of a memory bus, memory controller, peripheral bus, external bus, local bus, and/or another type of bus that can employ one or more bus architectures. One or more of these examples of the bus can be employed. In one or more embodiments, system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of system 100 can reside in the cloud, and/or can reside locally in a local computing environment (e.g., at a specified location(s)).

In addition to the processor and/or the memory described above, system 100 can comprise one or more computer and/or machine readable, writable and/or executable components and/or instructions that, when executed by the processor, can enable performance of one or more operations defined by such component(s) and/or instruction(s).

For example, at 116, policy manager 104 can attach a protection policy to a storage object (attach protection policy to volume (policy args, isResourceEfficientSnapRuleEnabled) command), wherein the storage object can comprise at least one of a volume or a file system, and policy manager 104 can trigger creation of internal snapshots. The protection policy can be associated with a resource efficient snapshot rule (or resource efficiency snap rule) to the storage object, wherein the resource efficient snapshot rule can be applicable to prevent redundant snapshot creation. At 118, policy manager 104 can communicate a success response with a protection policy ID to GUI 102.

Figure 2:
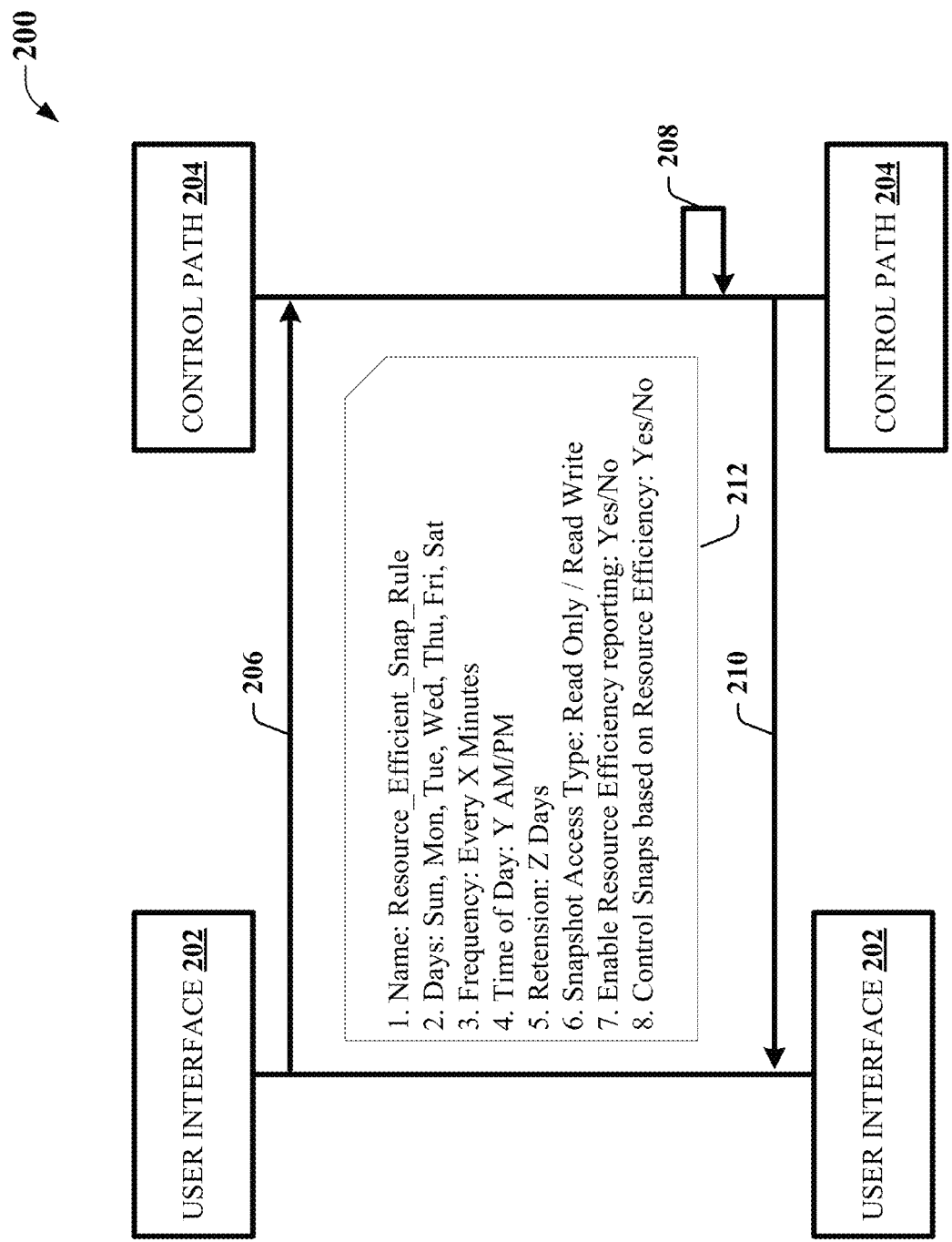
FIG. 2 illustrates a flow diagram of an example, non-limiting workflow of a protection policy creation with a snapshot rule in accordance with one or more embodiments described herein.

An exemplary protection policy has been illustrated in FIG. 2. Attaching the protection policy can be preceded by a user creating the protection policy with a resource efficient snapshot rule at GUI 102, and policy manager 104 can attach the protection policy to the storage object (e.g., a volume or a file system). Policy manager 104 can trigger a first creation of a first snapshot of the storage object a second creation of a second snapshot from the first snapshot, in response to the attaching of the protection policy to the storage object, wherein the first snapshot and the second snapshot can comprise identical snapshot information. The first snapshot and the second snapshot can be internal snapshots that can be automatically created in response to the attaching of the protection policy to the storage object, and the first snapshot and the second snapshot can always remain associated to the storage object.

For example, the user can request policy manager 104 via GUI 102 to attach the protection policy to the volume (or the file system) and attaching the protection policy to the volume (or the file system) can trigger policy manager 104 to create two internal snapshots-a common base snapshot (CBS) and another snapshot (CBS) identical to the CBS (e.g., snapshot of a snapshot) created from the CBS. The first CBS can be referred to as "snap 1" and the identical snapshot can be referred to as "snap 2." Attaching the protection policy to the volume (or the file system) can further trigger a snapshot creation schedule or snap schedule (trigger SnapSchedule (volume 1) command) and snap scheduler 106 can begin monitoring the snap schedule. For example, at 120, snap scheduler 106 can trigger the snap schedule (e.g., to generate a snapshot every hour, every day, etc.) based on a frequency of creation of snapshots defined by the resource efficient snapshot rule. That is, upon attaching the protection policy to the storage object, snap scheduler 106 can schedule a snapshot creation job, read a frequency of snapshot creation from the resource efficient snapshot rule, a time, and begin creation of snapshots.

The resource efficient snapshot rule can be further applicable to identify one or more redundant snapshots associated with the storage object, and send a notification of the one or more redundant snapshots directed to a user device associated with the storage object, wherein the notification of the one or more redundant snapshots can be sent to the user device via reporting for the storage object, and can enable the one or more redundant snapshots to be deleted via the user device, as a result of which metadata space associated with the storage object can be conserved.

At 122, snap engine control path component 108 can perform pre-checks. For example, snap engine control path component 108 can be a handler that can perform several pre-requisite checks comprising validating whether the volume (or the file system) has a protection policy with resource efficient snapshot rule enabled (block 132) and validating if the volume has two CBSs (block 134). Further, snap engine control path component 108 can perform a refresh operation based on the pre-checks. For example, as discussed elsewhere herein, the resource efficient snapshot rule can provide capabilities of resource efficiency reporting and controlling snapshot creation based on resource efficiency with respect to a storage object. During creation of a protection policy, a user can choose to have the resource efficiency reporting, the controlled snapshot creation or both the resource efficiency reporting and the controlled snapshot creation enabled. In a scenario wherein both the resource efficiency reporting and the controlled snapshot creation are chosen by a user, the controlled snapshot creation option can allow creation of a snapshot, however, upon receiving a snapshot request from a user (e.g., via a GUI) to create a snapshot, the controlled snapshot creation option can cause snap engine control path component 108 to first intercept the snapshot request without directly generating the snapshot.

For example, snap engine control path component 108 can first run a pre-check (run Prechecks (volume 1)) to determine whether the snapshot request is associated with a resource efficient snapshot rule enabled to perform certain operations (e.g., save computing resources). If so, snap engine control path component 108 can refresh, at 124, either of the CBSs (e.g., either snap 1 or snap 2), such that the CBS refreshed by snap engine control path component 108 can be updated to reflect an existing state/new state of the storage object, whereas the CBS not refreshed by snap engine control path component 108 can remain as original.

Further, snap engine control path component 108 can refresh the two CBSs (refresh internal snap 1/snap 2), based on a logic wherein at time T0, snap 1 can be refreshed, at time T2, snap 2 can be refreshed, at time T3, snap 1 can be refreshed again, and the cycle of alternately refreshing the two CBSs can continue (to flip). That is, snap engine control path component 108 can ensure that snap 1 and snap 2 are refreshed based on a logic which can further ensure that if at time T0 snap 1 is refreshed, then at time T1, snap 2 can be refreshed, at time T2, snap 1 can be refreshed again, at time T3, snap 2 can be refreshed again, and so on.

Snap refresh and diff component 110 can determine a difference between the two CBSs. For example, at 126, snap refresh and diff component 110 can execute a snapDiff operation (hereinafter, snapDiff) between the two CBSs (perform snapDiff (internal snap 1, internal snap 2) command). Snap refresh and diff component 110 can determine the difference between the two internal snapshots (i.e., a refreshed snapshot and an old snapshot), for example, via the snapDiff in a REST API request further described with respect to FIG. 4, and snap refresh and diff component 110 can translate the difference into a 64-bit encoded bitmap (translate the snapDiff output (64-bit encoded bitmap) command).

At 128, an output of the snapDiff can be sent to snap diff output translator 112. As stated earlier, the output of the snapDiff can be a 64-bit encoded bitmap response. Snap diff output translator 112 can parse the 64-bit encoded bitmap to binary, wherein the binary output can be required to be inversed to identify a correct order of bits. Snap diff output translator 112 can translate a snapDiff response for interpretation of shared and unshared regions between the two CBSs.

At 130, the binary output can be sent to/injected into core logical engine 114. Core logical engine 114 can process the binary output to suggest a logical action. Core logical engine 114 can comprise logic that can detect unique bits, redundant bits, unique but all zero bits, unique but all unallocated bits and unique but partial (unique, zeroed, unallocated) bits (e.g., for start and end offset find: 1. snap with unique bits detection, 2. snap with redundant bits detection, 3. snap with unique but all zero bits detection, 4. snap with unique but all unallocated bits detection, 5. Snap with unique but partial (unique, zeroed, unallocated) bits detection). Partial bits can appear as, for example, 1000 0000, wherein the "1" can indicate unique data, whereas the zeros can indicate no data. Upon acquiring the data, core logical engine 114 can inform snap scheduler 106 whether to take a snapshot or not. For example, core logical engine 114 can process the binary output received from snap diff output translator 112.

Further, core logical engine 114 can detect any uniquely allocated storage regions between the first snapshot and the second snapshot. For example, core logical engine 114 can detect existence of uniquely allocated storage regions between the two CBSs (block 136). Core logical engine 114 can detect the uniquely allocated storage regions based on an API, wherein the API can use at least one of a starting offset, a length, a chunk size of data comprised in the storage object, a base snapshot and a refreshed snapshot as input to generate an encoded bitmap comprising the uniquely allocated storage regions.

For example, as stated elsewhere herein, system 100 (e.g., a resource efficient snap engine) can utilize a snapDiff API capability. The snapDiff API can be an internal rest API that can identify and return uniquely allocated regions of a snapshot or unshared regions between two snapshots of a volume. The snapDiff API can consider a starting offset, a length, a chunk size, an optional base snapshot and a refreshed snapshot as input and generate a 64-bit encoded bit map consisting of uniquely allocated regions between the two snapshots. A set bit in the bitmap output can indicate a unique region between the two snapshots. In absence of a base snapshot, the snapDiff API can start operations from a beginning offset and return a bitmap that can contain non-zero regions of a snapshot. For this implementation, snapDiff API can also be required to provide extra bit information for each uniquely allocated bit, identifying whether the uniquely allocated bit is zero or unallocated.

Further, core logical engine 114 can comprise machine executable instructions that, when executed, can determine whether to take snapshots or not based on the snapDiff response and extra bit information. For example, wherein a determination can be that extra bits of at least one uniquely allocated storage region exist and are unallocated or zeroed out, core logical engine 114 can prevent a third creation of a third snapshot, based on the determination that the extra bits of the at least one uniquely allocated storage region exist and are unallocated or zeroed out. Alternately, wherein the determination can be that extra bits of at least one uniquely allocated storage region exist and are allocated or not zeroed out, core logical engine 114 can trigger the third creation of the third snapshot, based on the determination that the extra bits of the at least one uniquely allocated storage region exist and are allocated or not zeroed out.

More specifically, if core logical engine 114 can detect unshared regions, core logical engine 114 can further check extra bit information to determine if any extra bits are unallocated or zeroed out (block 138). If the extra bit information can indicate that all extra bits are unallocated or zeroed out, core logical engine 114 can recommend to snap scheduler 106 to not take a snapshot of a refreshed CBS (e.g., snap 1 or snap 2), at 142, thereby preventing creation of the external snapshot (If true, return 'Do not take a snap' command). If the extra bits are allocated or not zeroed out, core logical engine 114 can trigger snap scheduler 106 to create the external snapshot, at 144 (Else, return 'TakeASnap (refreshed internal snap information)' command). The creation of the external snapshot can comprise taking a snapshot of a refreshed CBS (e.g., snap 1 or snap 2), wherein the snapshot can serve as the external snapshot that can be reflected at GUI 102.

Further, wherein a determination can be that no extra bits and no uniquely allocated storage regions exist, core logical engine 114 can validate existence of at least one external snapshot associated with the protection policy, based on the determination that no extra bits and no uniquely allocated storage regions exist. The validating can comprise determining that the at least one external snapshot does not exist, wherein core logical engine 114 can trigger the third creation of the third snapshot, in response to the determining that the at least one external snapshot does not exist.

More specifically, if no unshared regions can be detected by core logical engine 114, core logical engine 114 can validate existence of at least one external snapshot of the volume attached with the protection policy (block 140). If an external snapshot can be detected, core logical engine 114 can indicate to snap scheduler 106 to not take an external snapshot, at 146 (If true, return 'Do not take a snap' command). If no external snapshot can be detected, core logical engine 114 can trigger snap scheduler 106 to take an external snapshot, at 148, since the external snapshot can be the first snapshot of the volume (or the file system) available to a user (Else, return 'TakeASnap (refreshed internal snap information)' command).

FIG. 2 illustrates a flow diagram of an example, non-limiting workflow 200 of a protection policy creation with a snapshot rule in accordance with one or more embodiments described herein. Aspects of workflow 200 can be implemented by one or more components of system 100. Repetitive description of like elements and/or processes employed in respective embodiments is omitted for sake of brevity.

In an embodiment, protection policy 212 can be attached to a storage object, wherein the storage object can comprise at least one of a volume or a file system. Protection policy 212 can be associated with a resource efficient snapshot rule that can provide, to a user, the options of resource efficiency reporting and controlled snapshot creation. A user can select the resource efficiency reporting option during creation of protection policy 212, wherein the resource efficiency reporting can provide only reporting capabilities to a system (e.g., system 100) for the storage object without providing capabilities to perform one or more actions over a report. Likewise, a user can select both the resource efficiency reporting and the controlled snapshot creation, wherein the controlled snapshot creation option can automatically prevent creation of snapshots. Thus, the resource efficient snapshot rule associated with protection policy 212 can allow a user to engage with the one or more solutions discussed herein. Further, by attaching protection policy 212 to the storage object, snapshot creation for the storage object can be controlled.

FIG. 2 can illustrate a basic structure of a protection policy. At 206, protection policy 212 can be created by an entity via user interface (UI) 202. In an embodiment, the entity can be a human user. In another embodiment, the entity can be a hardware, software, machine or artificial intelligence (AI). During creation of protection policy 212, the entity can define rules (resource efficient snapshot rules) for protection policy 212, at 208, via control path 204. For example, the entity can define a name for the rule, days of the week when snapshots associated with the storage object can be generated, a frequency of snapshots generation, time of the day, a retention period for the snapshots, and a snapshot access type (e.g., as respectively described by items 1-6 in FIG. 2). In one or more embodiments, the entity can further define whether resource efficiency reporting (for only reporting redundant snapshots), controlled snapshot creation based on resource efficiency (for automatic action on redundant snapshots/preventing creation of redundant snapshots to preserve computing resources) or both are to be enabled (e.g., as respectively described by items 7 and 8 in FIG. 2). At 210, control path 204 can communicate to the entity via UI 202 that the resource efficient snapshot rule has been successfully created.

Upon selection of resource efficiency reporting, the following types of reporting, as described below with reference to table 1, table 2, and table 3, can be provided by the system (e.g., system 100)/by a logic running behind the system. The reporting can only be provided for the storage object attached to protection policy.

TABLE 1

Reporting for base snapshots and redundant snapshots taken per a schedule.

| Base snap creation time | Base snap | Redundant snap creation time | Redundant snap |
|---|---|---|---|
| 10:00 AM | Snap_1 | 10:05 AM | Snap_2 |
| 10:00 AM | Snap_1 | 10:10 AM | Snap_3 |
| 10:00 AM | Snap_1 | 10:15 AM | Snap_4 |

TABLE 2

Reporting for uniquely allocated snapshots wherein all data bits can be unallocated along with a recommendation to delete the snapshots.

| Base snap creation time | Base snap | 'Snap with all data unallocated' creation time | Snap with all data unallocated data |
|---|---|---|---|
| 10:20 AM | Snap_5 | 10:25 AM | Snap_6 |

TABLE 3

Reporting for uniquely allocated snapshots wherein all data bits are zeroed out along with a recommendation to delete the snapshots.

| Base snap creation time | Base snap | 'Snap with all data zeroed' creation time | Snap with all data unallocated data |
|---|---|---|---|
| 10:30 AM | Snap_7 | 10:35 AM | Snap_8 |

Figure 3:
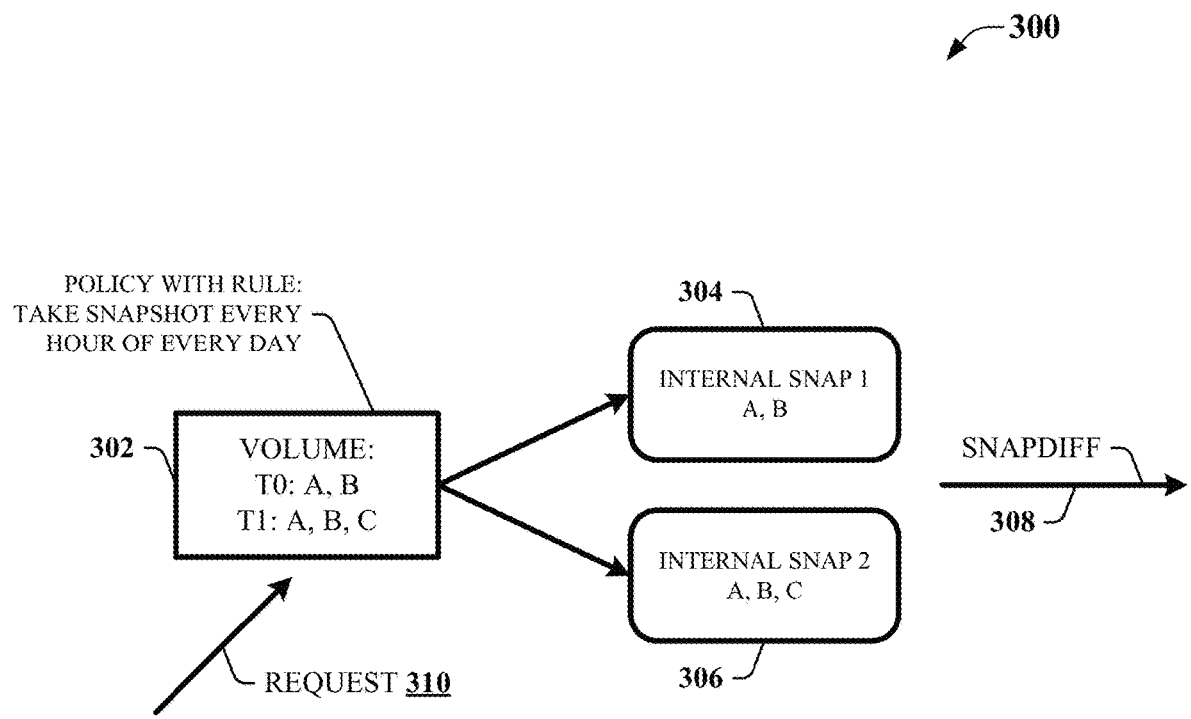
FIG. 3 illustrates a flow diagram of an example, non-limiting process for creating internal snapshots of a system in accordance with one or more embodiments described herein.

With reference to table 1, the resource efficient reporting can provide reporting on a base snapshot creation time (e.g., detailing a time of creation of the base snapshot), a name of the base snapshot (e.g., snap 1), a redundant snapshot creation time (e.g., detailing a time of creation of the base snapshot) and a name of the redundant snapshot (e.g., snap 2, snap 3, snap 4) while accounting for other rules specified in protection policy 212. For example, in a scenario wherein a frequency of creation of snapshots as defined via protection policy 212 can be every hour of a day, a logic associated with the resource efficiency reporting can report the above identified information for all 24 snapshots generated. With reference to table 2, the reporting provided by the logic of the resource efficiency reporting can identify snapshots that can be unique in nature but unallocated (i.e., not comprising any data). Unallocated data can refer to bits that may have been located but later deleted by an application from the main storage object. The reporting can indicate to the entity that such snapshots can be deleted. With reference to FIG. 3, the reporting provided by the logic of the resource efficiency reporting can identify snapshots that can be uniquely allocated but wherein data can be all zeroed out. The reporting as described above can be presented to the entity at UI 202.

Resource efficiency reporting can inform a user of the contents inside snapshots, for example, whether a snapshot comprises true data, whether data is zeroed, whether a snapshot comprises no data, etc., wherein some snapshots can be useless to the user. For example, a user can be unaware of operations inside an application environment. For example, some applications (e.g., VMware or other solutions) can decide that certain data can be discarded and remove data from a system from one offset to another offset. The data can be metadata and may not matter to a customer if deleted. Thus, a platform can cause metadata to be deleted from a storage object, which is known as unallocation. Some applications can write deliberate zeroes in the bits of the deleted data. An application can do so deliberately or without a user at a UI knowing. While an application can be developed for a particular task, snapshots can be taken blindly, however, the application can be unaware of contents inside the snapshots. Thus, the resource efficient snapshot reporting can indicate whether a snapshot is redundant or not and whether the snapshot is uniquely allocated (e.g., a user can think that a snapshot is unique but data inside the snapshot can be useless or zeroed). Based on the resource efficient reporting, the entity can decide to delete the snapshot or not to delete the snapshot.

Protection policy 212 can be an automated framework that can be provided as part of a storage platform as UI, and protection policy 212 can provide capabilities for performing or automating certain operations such as, for example, automating snapshot creation. Generally, data products can comprise an industrial standard framework that can be integrated with various systems. In some platforms the framework can be known as rules, protection policy with rules, etc. For example, DELL's PowerStorage can comprise a framework that can be integrated with a UI to facilitate certain operations automatically.

FIG. 3 illustrates a flow diagram of an example, non-limiting process 300 for creating internal snapshots of a system in accordance with one or more embodiments described herein. Aspects of process 300 can be implemented by one or more components of system 100. Repetitive description of like elements and/or processes employed in respective embodiments is omitted for sake of brevity.

In an embodiment, a protection policy can be attached to a storage object, wherein the storage object can comprise at least one of a volume or a file system. Attaching the protection policy to the storage object can trigger a first creation of a first snapshot of the storage object and a second creation of a second snapshot from the first snapshot, wherein the first snapshot and the second snapshot can comprise identical snapshot information. The first snapshot and the second snapshot can be internal snapshots that can be automatically created in response to the attaching of the protection policy to the storage object, and the first snapshot and the second snapshot can always remain associated to the storage object.

For example, volume 302 can comprise items A and B at time T0, and a protection policy with a resource efficient snapshot rule (e.g., to take a snapshot every hour of every day) can be attached to volume 302. Attaching the protection policy can trigger a policy manager (e.g., policy manager 104) to generate two internal snapshots, snap 304 (or internal snap 1) and snap 306 (or internal snap 2) of volume 302.

Volume 302 can be visible to a user, whereas the two internal snapshots can be invisible to the user at a GUI (e.g., GUI 102, GUI 202). Upon generation, snap 304 and snap 306 can be identical snapshots. At time T1, volume 302 can be updated with addition of item C. Thereafter, a snap engine control path component (e.g., snap engine control path component 108) can refresh snap 306, which can cause snap 306 to be updated to reflect the updated volume 302 with the new data item C (e.g., be an exact replica of volume 302), whereas snap 304 can continue to reflect characteristics of volume 302 at time T0. In other words, one of the two internal snapshots (herein, snap 306) can be refreshed to be in synchronization with volume 302.

Thereafter, at 308, a snap refresh and diff component (e.g., snap refresh and diff component 110) can determine a difference between snap 304 and snap 306 via a snapDiff, to further determine whether an external snapshot (e.g., that can be visible to an entity at a GUI) can be useful to generate. For example, snap 306 can be a redundant snapshot and an external snapshot taken of snap 306 can be unnecessary. Based on an output of the snapDiff, and in accordance with operations described with reference to FIG. 1, a core logical engine (e.g., core logical engine 114) can indicate to a snap scheduler (e.g., snap scheduler 106) whether an external snapshot of snap 306 can be generated, and an external snapshot, if generated, can be presented to the entity at GUI. Thus, while a request (e.g., request 310) for generating an external snapshot can be saved in a system (e.g., system 100), an external snapshot can only be generated upon a determination (e.g., by core logical engine 114) that the external snapshot is useful (i.e., not redundant, not unique but unallocated/zeroed bits, etc.).

FIG. 4 illustrates an example, non-limiting code 400 related to a snapDiff API request and response in accordance with one or more embodiments described herein. Aspects of code 400 can be implemented by one or more components of system 100. Repetitive description of like elements and/or processes employed in respective embodiments is omitted for sake of brevity.

FIG. 4 can illustrate an example of a snapDiff API request and response. In the exemplary snapDiff API described in FIG. 4, two snapshots of a volume have been considered, wherein a first snapshot can be taken at time T0, for example, when no data is written on a volume. The second snapshot can be taken after writing some data on the volume. The snapDiff API can be applied with the second snapshot from the beginning of the offset (e.g., offset 0) up to a length of 4 megabytes (4 MB) (length=4194304 bytes) with a chunk granularity of 1 MB (chunk_size=1048576 bytes). This can indicate that the first 1 MB of the snapshot can be a uniquely allocated block. The next offset can indicate next possible offset information to find uniquely allocated data. The snapDiff API can be run with the next offset being 62914560 to determine whether any uniquely allocated blocks can exist beyond that offset.

More specifically, FIG. 4 illustrates a string at 404. The link at 402 and the string at 404 can be two snapshots (e.g., two internal snapshots) that can be compared to identify a difference between the two internal snapshots. If the difference can indicate that all bits of a refreshed snapshot reflecting a state of a storage object are zeroed out or unallocated, an external snapshot can be useless. And if the difference can indicate allocation, the allocation can be reflected in a conversion, as indicated at 418, which can be useful since the allocation can indicate non-empty bits/bits comprising data. A REST request can be a REST API and the string at 404 can be an input to the REST API, based on which the API can be instructed to determine a snapDiff between the two snapshots (e.g., at 402 and 404). The API can start from an offset of 0, as indicated at 406 and run till a length of 4K (length being in bits) as indicated at 408. The chunk size, as indicated at 410 can indicate how many bits of information can be required. At 418, the API can indicate whether the '1' from 1000 0000 can be 1 giga byte (GB) in size or the data can be 1 GB in size. Thus, the chuck can be taken as a segment, the length can specify an end till which the two snapshots can be compared, and the offset can be the starting point for comparison of the snapshots.

As stated elsewhere herein, the snapDiff API can compare snapshots and indicate a difference between the snapshots, without indicating whether a snapshot is unique. The snap-Diff API can be a standard API (e.g., as used in DELL PowerStore). The difference between the snapshots can be reflected in a 64-bit encoded bitmap (e.g., "AQ== "), as indicated at 412. The 64-bit bitmap can be interpreted and converted to binary, as indicated at 416. The zeroes can indicate unallocated data, and the "1" can indicate allocated data. The binary can be further inverted as indicated at 418. The output can be processed by core logical engine 114 to determine allocated data, unallocated data, zeroed data, etc.

Figure 5:
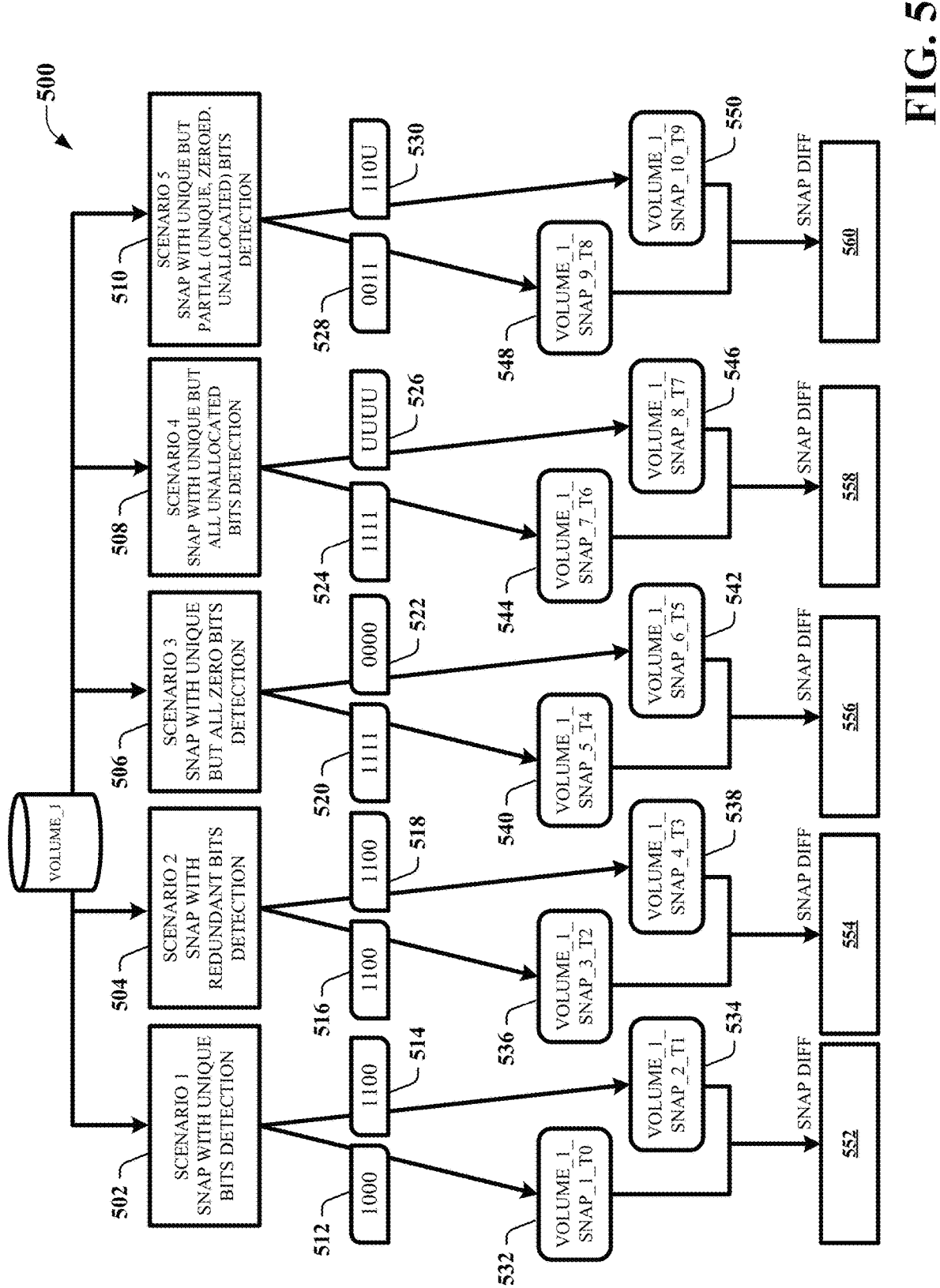
FIG. 5 illustrates a flow diagram of example, non-limiting use cases in accordance with one or more embodiments described herein.

FIG. 5 illustrates a flow diagram of example, non-limiting use cases 500 in accordance with one or more embodiments described herein. Repetitive description of like elements and/or processes employed in respective embodiments is omitted for sake of brevity.

In one or more embodiments, core logical engine 114 can process an output of a snapDiff to determine whether a snapshot of a storage object (e.g., volume 1) can be generated.

For example, in scenario 1 at 502, core logical engine 114 can detect a snapshot with unique bits. For example, at time T0 (at 512), the volume can comprise 1000 data bits and at time T1 (at 514), the volume can comprise 1100 data bits. Snap 1 of the volume (at 532) can reflect the state of the volume at time T0 and snap 2 of the volume (at 534) can reflect the state of the volume at time T1. Based on an output of a snapDiff executed over snap 1 and snap 2. core logical engine 114 can determine, at 552, that bits at position 2 (i.e., 514) are uniquely allocated with the extra bit information indicating that all bits are not zeroed/unallocated.

In scenario 2 at 504, core logical engine 114 can detect a snapshot with redundant bits. For example, at time T2 (at 514), the volume can comprise 1100 data bits and at time T3 (at 518), the volume can still comprise 1100 data bits. Snap 3 of the volume (at 536) can reflect the state of the volume at time T2 and snap 4 of the volume (at 538) can reflect the state of the volume at time T3. Based on an output of a snapDiff executed over snap 3 and snap 4, core logical engine 114 can determine, at 554, that no unique bits can be detected.

In scenario 3 at 506, core logical engine 114 can detect a snapshot with unique but all zeroed bits. For example, at time T4 (at 520), the volume can comprise 1111 data bits and at time T5 (at 522), the volume can comprise 0000 data bits. Snap 5 of the volume (at 540) can reflect the state of the volume at time T4 and snap 6 of the volume (at 542) can reflect the state of the volume at time T5. Based on an output of a snapDiff executed over snap 5 and snap 6, core logical engine 114 can determine, at 556, that all bits are uniquely allocated with the extra bit information indicating that all bits are zeroed.

In scenario 4 at 508, core logical engine 114 can detect a snapshot with unique but all unallocated bits. For example, at time T6 (at 524), the volume can comprise 1111 data bits and at time T7 (at 525), the volume can comprise UUUU data bits. Snap 7 of the volume (at 544) can reflect the state of the volume at time T6 and snap 8 of the volume (at 546) can reflect the state of the volume at time T7. Based on an output of a snapDiff executed over snap 7 and snap 8, core logical engine 114 can determine, at 558, that all bits are unique bits with the extra bit information indicating that all bits are unallocated.

In scenario 5 at 510, core logical engine 114 can detect a snapshot with unique but partial (unique, zeroed and unallocated) bits. For example, at time T8 (at 528), the volume can comprise 0011 data bits and at time T9 (at 530), the volume can comprise 110U data bits. Snap 9 of the volume (at 548) can reflect the state of the volume at time T8 and snap 10 of the volume (at 550) can reflect the state of the volume at time T9. Based on an output of a snapDiff executed over snap 9 and snap 10, core logical engine 114 can determine, at 560, that all bits are uniquely allocated with the extra bit information indicating that first and second bits are unique, a third bit is zeroed and a fourth bit is unallocated.

Figure 6:
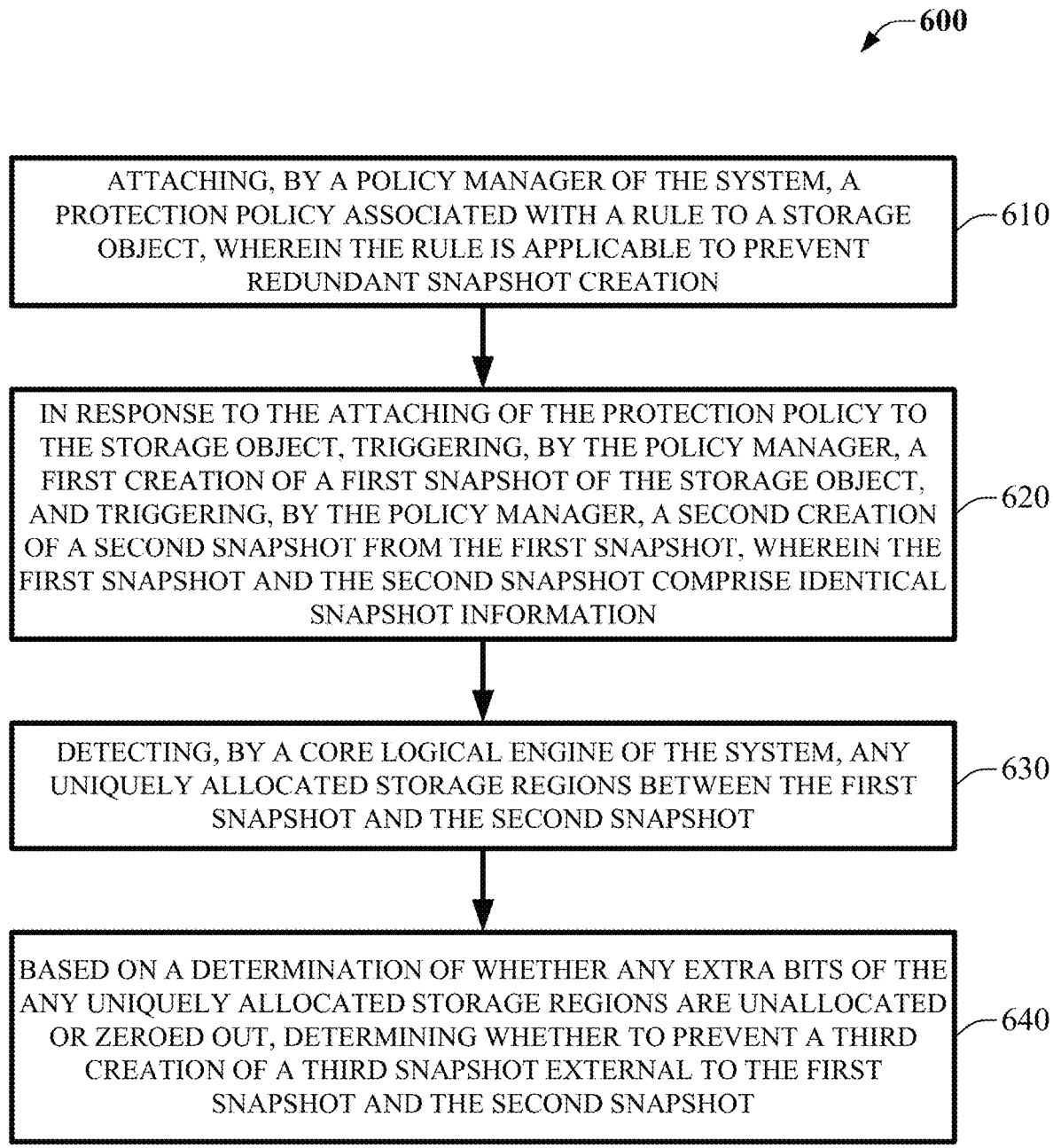
FIG. 6 illustrates a flow diagram of example, non-limiting operations executed by a system that can determine whether to prevent creation of a snapshot in accordance with one or more embodiments described herein.

FIG. 6 illustrates a flow diagram of example, non-limiting operations 600 executed by a system that can determine whether to prevent creation of a snapshot in accordance with one or more embodiments described herein. Repetitive description of like elements and/or processes employed in respective embodiments is omitted for sake of brevity.

Non-limiting operations 600 can be executed by a system comprising a processor and a memory that can store executable instructions that, when executed by the processor, can facilitate performance of non-limiting operations 600.

At 610, non-limiting operations 600 can comprise attaching, by a policy manager (e.g., policy manager 104) of the system, a protection policy associated with a rule to a storage object, wherein the rule can be applicable to prevent redundant snapshot creation.

At 620, non-limiting operations 600 can comprise, in response to the attaching of the protection policy to the storage object, triggering, by the policy manager (e.g., policy manager 104), a first creation of a first snapshot of the storage object, and triggering, by the policy manager, a second creation of a second snapshot from the first snapshot, wherein the first snapshot and the second snapshot comprise identical snapshot information.

At 630, non-limiting operations 600 can comprise detecting, by a core logical engine (e.g., core logical engine 114) of the system, any uniquely allocated storage regions between the first snapshot and the second snapshot.

At 640, non-limiting operations 600 can comprise, based on a determination of whether any extra bits of the any uniquely allocated storage regions are unallocated or zeroed out, determining (e.g., by core logical engine 114) whether to prevent a third creation of a third snapshot external to the first snapshot and the second snapshot.

Figure 7:
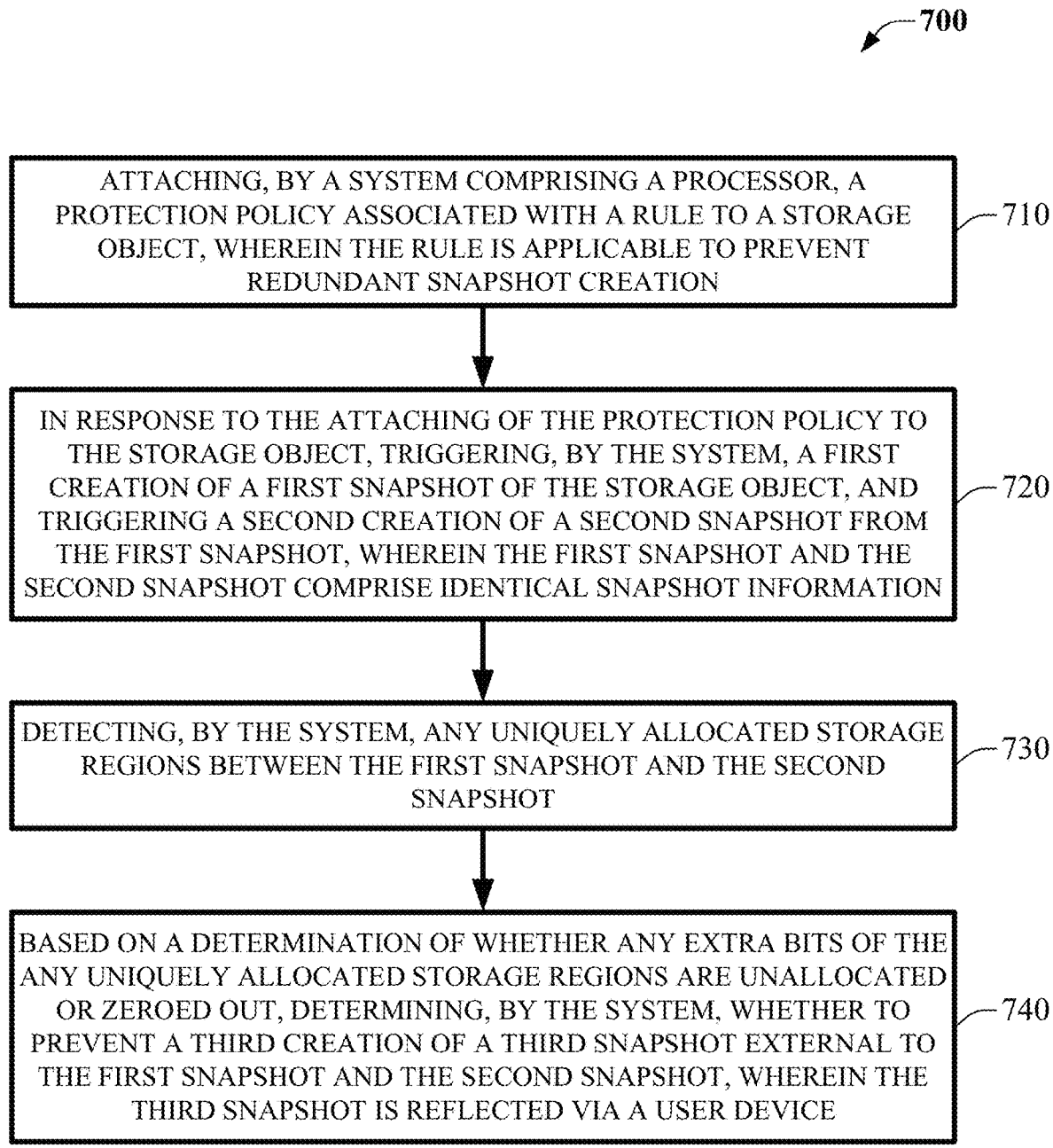
FIG. 7 illustrates a flow diagram of an example, non-limiting method that can determine whether to prevent creation of an external snapshot that can be reflected via a user device in accordance with one or more embodiments described herein.

FIG. 7 illustrates a flow diagram of an example, non-limiting method 700 that can determine whether to prevent creation of an external snapshot that can be reflected via a user device in accordance with one or more embodiments described herein. Repetitive description of like elements and/or processes employed in respective embodiments is omitted for sake of brevity.

At 710, non-limiting method 700 can comprise attaching (e.g., by policy manager 104), by a system comprising a processor, a protection policy associated with a rule to a storage object, wherein the rule can be applicable to prevent redundant snapshot creation.

At 720, non-limiting method can comprise, in response to the attaching of the protection policy to the storage object, triggering (e.g., by policy manager 104), by the system, a first creation of a first snapshot of the storage object, and triggering a second creation of a second snapshot from the first snapshot, wherein the first snapshot and the second snapshot comprise identical snapshot information.

At 730, non-limiting method 700 can comprise detecting (e.g., by core logical engine 114), by the system, any uniquely allocated storage regions between the first snapshot and the second snapshot.

At 740, non-limiting method 700 can comprise, based on a determination of whether any extra bits of the any uniquely allocated storage regions are unallocated or zeroed out, determining (e.g., by core logical engine 114), by the system, whether to prevent a third creation of a third snapshot external to the first snapshot and the second snapshot, wherein the third snapshot is reflected via a user device.

Figure 8:
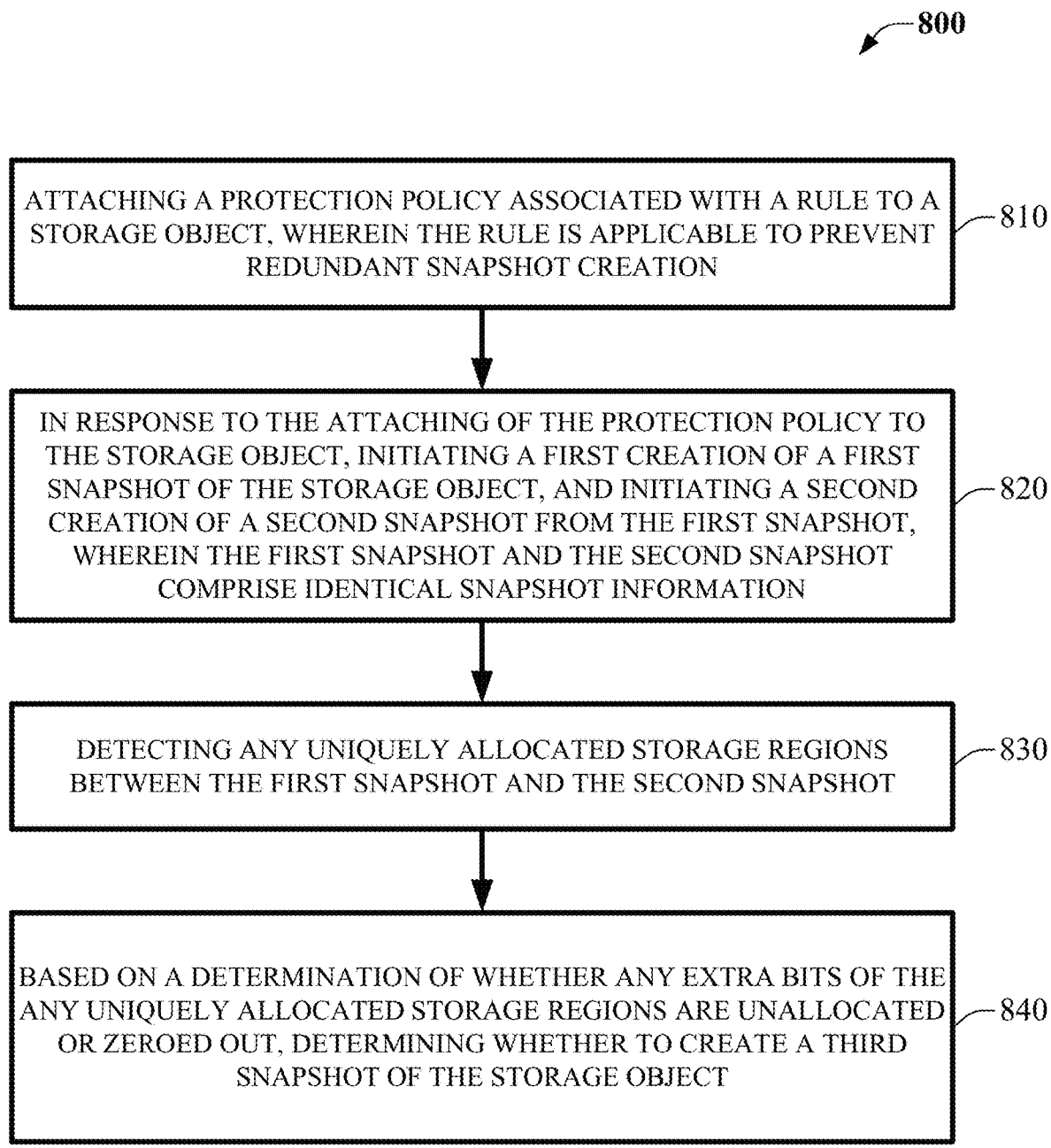
FIG. 8 illustrates a flow diagram of example, non-limiting operations related to determining whether to create a snapshot of a storage object in accordance with one or more embodiments described herein.

FIG. 8 illustrates a flow diagram of example, non-limiting operations 800 related to determining whether to create a snapshot of a storage object in accordance with one or more embodiments described herein. Repetitive description of like elements and/or processes employed in respective embodiments is omitted for sake of brevity.

Non-limiting operations 800 can correspond to a non-transitory machine-readable medium, comprising executable instructions that, when executed by a processor, facilitate performance of non-limiting operations 800.

At 810, non-limiting operations 800 can comprise attaching (e.g., by policy manager 104) a protection policy associated with a rule to a storage object, wherein the rule can be applicable to prevent redundant snapshot creation.

At 820, non-limiting operations 800 can comprise, in response to the attaching of the protection policy to the storage object, initiating (e.g., by policy manager 104) a first creation of a first snapshot of the storage object, and initiating a second creation of a second snapshot from the first snapshot, wherein the first snapshot and the second snapshot comprise identical snapshot information.

At 830, non-limiting operations 800 can comprise detecting (e.g., by core logical engine 114) any uniquely allocated storage regions between the first snapshot and the second snapshot.

At 840, non-limiting operations 800 can comprise, based on a determination of whether any extra bits of the any uniquely allocated storage regions are unallocated or zeroed out, determining (e.g., by core logical engine 114) whether to create a third snapshot of the storage object.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively detect uniquely allocated storage regions between snapshots or determine whether any extra bits of the any uniquely allocated storage regions are unallocated or zeroed out as the one or more embodiments described herein can enable this process. And, neither can the human mind nor a human with pen and paper trigger or prevent creation of a snapshot based on a determination of whether any extra bits of the any uniquely allocated storage regions are unallocated or zeroed out, as conducted by one or more embodiments described herein.

Figure 9:
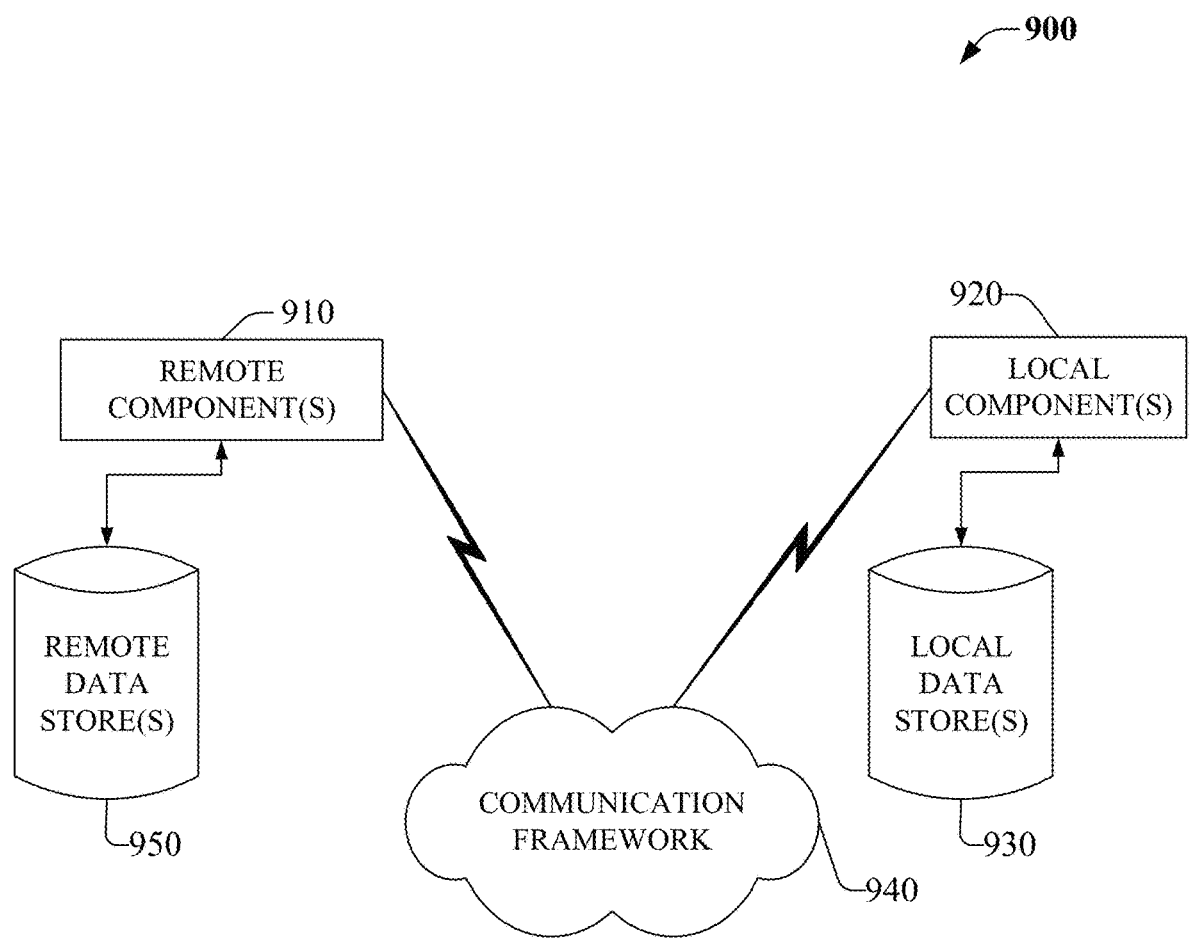
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

In order to provide a context for the various elements of the disclosed subject matter, the following discussion is intended to provide a brief, general description of a suitable environment in which the various embodiments of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 930 and remote data store(s) 950, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. One or more embodiments described and suggested herein can also be practiced in distributed computing environments where tasks are performed by remote processing devices that are linked through a communications network; however, some if not all parts of the subject disclosure can be practiced on stand-alone computers. In a distributed computing environment, program modules can be located in both local and remote memory storage devices.

Figure 10:
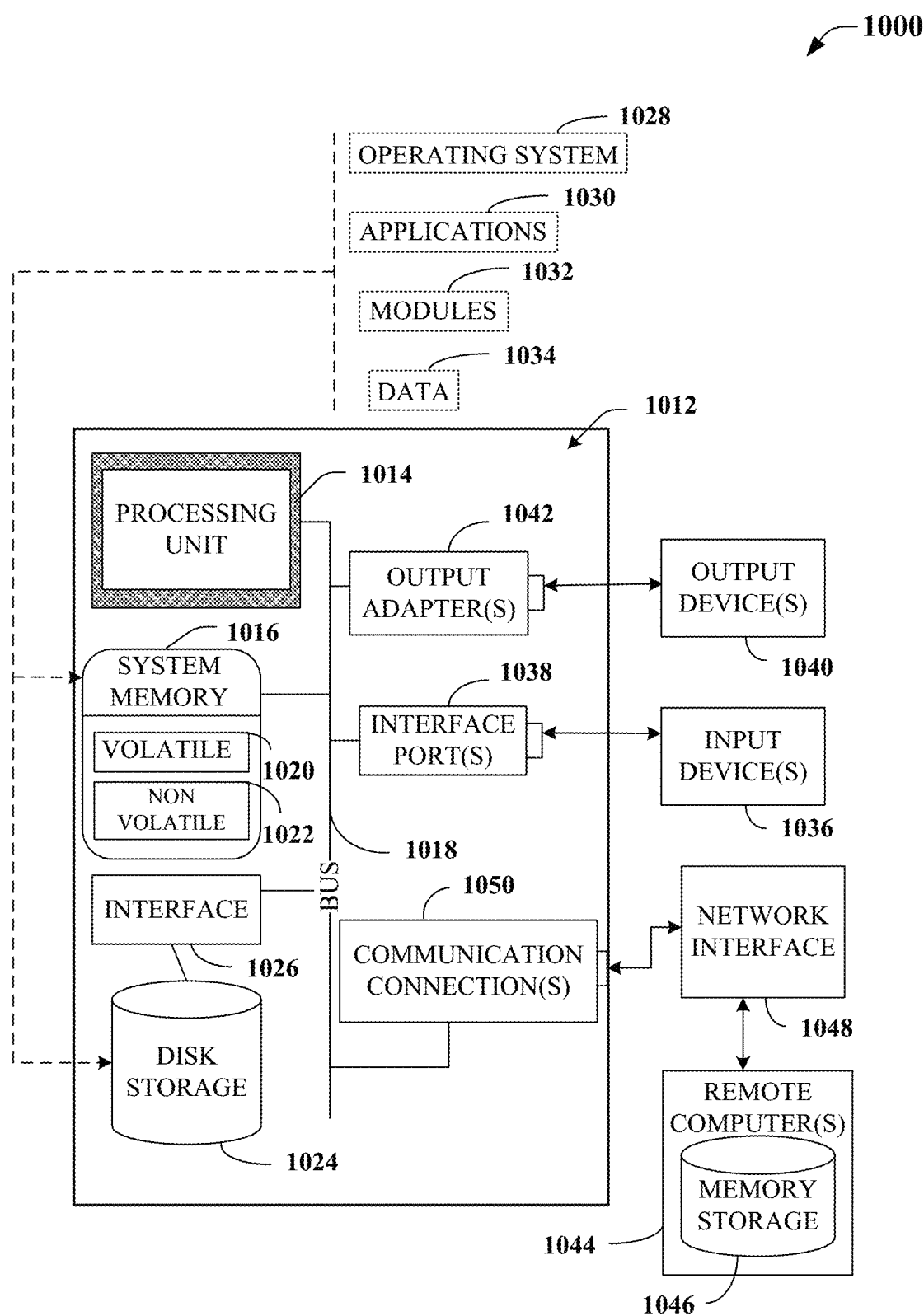
FIG. 10 illustrates an example block diagram of a computing system operable to execute the disclosed systems and methods in accordance with an embodiment.

FIG. 10 illustrates a block diagram of a computing system 1000 operable to execute the disclosed systems and methods in accordance with an embodiment. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed or requested basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to as extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed:

1. A system, comprising:
   a processor; and
   a memory that stores executable instructions that, when executed by the processor, facilitate performance of operations, the operations comprising:
   attaching, by a policy manager of the system, a protection policy associated with a rule to a storage object, wherein the rule is applicable to prevent redundant snapshot creation;
   in response to the attaching of the protection policy to the storage object, triggering, by the policy manager, a first creation of a first snapshot of the storage object, and triggering, by the policy manager, a second creation of a second snapshot from the first snapshot, wherein the first snapshot and the second snapshot comprise identical snapshot information;
   refreshing, using a snap engine control path process, the first snapshot to capture a difference between a current state of the storage object and a prior state of the storage object, wherein the first snapshot reflects the current state of the storage object and the second snapshot reflects the prior state of the storage object;
   detecting, by a core logical engine of the system, based on the difference, uniquely allocated storage regions between the first snapshot and the second snapshot;
   based on a determination of whether any extra bits of the uniquely allocated storage regions exist, determining whether to prevent a third creation of a third snapshot, wherein the third snapshot is external to the first snapshot and the second snapshot, wherein, based on the determination being that the extra bits of the uniquely allocated storage regions exist and are unallocated or zeroed out, the operations further comprise preventing, by the core logical engine, the third creation of the third snapshot.

2. The system of claim 1, wherein the rule is further applicable to identify one or more redundant snapshots associated with the storage object, and send a notification of the one or more redundant snapshots directed to a user device associated with the storage object, and wherein the notification of the one or more redundant snapshots is sent to the user device via reporting for the storage object, and enables the one or more redundant snapshots to be deleted via the user device, as a result of which metadata space associated with the storage object is conserved.

3. The system of claim 1, wherein the storage object comprises at least one of a volume or a file system.

4. The system of claim 1, wherein the core logical engine uses an application programming interface (API) for detection of the uniquely allocated storage regions, and wherein the API uses at least one of a starting offset, a length, a chunk size of data comprised in the storage object, a base snapshot and a refreshed snapshot as input to generate an encoded bitmap comprising the uniquely allocated storage regions.

5. The system of claim 1, wherein, based on the determination being that no extra bits and no uniquely allocated storage regions exist, the operations further comprise validating, by the core logical engine, existence of at least one external snapshot associated with the protection policy.

6. The system of claim 5, wherein the validating comprises determining that the at least one external snapshot does not exist, and wherein the operations further comprise, in response to the determining that the at least one external snapshot does not exist, triggering, by the core logical engine, the third creation of the third snapshot.

7. The system of claim 1, wherein, based on the determination being that the extra bits of the uniquely allocated storage regions exist and are allocated or not zeroed out, and wherein the operations further comprise triggering, by the core logical engine, the third creation of the third snapshot.

8. A method, comprising:
   attaching, by a system comprising a processor, a protection policy associated with a rule to a storage object, wherein the rule is applicable to prevent redundant snapshot creation;
   in response to the attaching of the protection policy to the storage object, triggering, by the system, a first creation of a first snapshot of the storage object, and triggering a second creation of a second snapshot from the first snapshot, wherein the first snapshot and the second snapshot comprise identical snapshot information;
   refreshing, by the system, the second snapshot to capture a difference between a current state of the storage object and a prior state of the storage object, wherein the second snapshot reflects the current state of the storage object and the first snapshot reflects the prior state of the storage object;

detecting, by the system, based on the difference, uniquely allocated storage regions between the first snapshot and the second snapshot;

based on a determination of whether any extra bits of the uniquely allocated storage regions exist, determining, by the system, whether to prevent a third creation of a third snapshot external to the first snapshot and the second snapshot, wherein the third snapshot is reflected via a user device, wherein the determination comprises the determination that extra bits of the uniquely allocated storage regions exist and are unallocated or zeroed out; and based on the determination that the extra bits of the uniquely allocated storage regions exist and are unallocated or zeroed out, preventing, by the system, the third creation of the third snapshot.

9. The method of claim 8, wherein the rule is further applicable to identify one or more redundant snapshots associated with the storage object, and send a notification of the one or more redundant snapshots directed to the user device associated with the storage object, and wherein the notification of the one or more redundant snapshots is sent to the user device according to a reporting process applicable to the storage object, and enables the one or more redundant snapshots to be deleted, via the user device, to conserve metadata space associated with the storage object.

10. The method of claim 8, wherein the storage object comprises at least one of a volume or a file system.

11. The method of claim 8, further comprising:
using, by the system, an application programming interface (API) for detection of the uniquely allocated storage regions, wherein the API uses at least one of a starting offset, a length, a chunk size of data comprised in the storage object, a base snapshot and a refreshed snapshot as input to generate an encoded bitmap comprising the uniquely allocated storage regions.

12. The method of claim 8, wherein the determination comprises the determination that no extra bits and no uniquely allocated storage regions exist, and further comprising validating, based on the determination that no extra bits and no uniquely allocated storage regions exist, existence of at least one external snapshot associated with the protection policy.

13. The method of claim 12, wherein the validating comprises determining that the at least one external snapshot does not exist, and further comprising, in response to the determining that the at least one external snapshot does not exist, triggering, by the system, the third creation of the third snapshot.

14. The method of claim 8, wherein the determination comprises the determination that the extra bits of the uniquely allocated storage regions exist and are allocated or not zeroed out, and further comprising, based on the determination that the extra bits of the uniquely allocated storage regions exist and are allocated or not zeroed out, triggering, by the system, the third creation of the third snapshot.

15. A non-transitory machine-readable medium, comprising executable instructions that, when executed by a processor, facilitate performance of operations, the operations comprising:
attaching a protection policy associated with a rule to a storage object, wherein the rule is applicable to prevent redundant snapshot creation;

in response to the attaching of the protection policy to the storage object, initiating a first creation of a first snapshot of the storage object, and initiating a second creation of a second snapshot from the first snapshot, wherein the first snapshot and the second snapshot comprise identical snapshot information;

alternately refreshing the first snapshot and the second snapshot to capture a difference between a current state of the storage object and a prior state of the storage object;

detecting, based on the difference, uniquely allocated storage regions between the first snapshot and the second snapshot; and based on a determination of whether any extra bits of the uniquely allocated storage regions exist, determining whether to create a third snapshot of the storage object, wherein a result of the determination is the determination that extra bits of the uniquely allocated storage regions exist and are unallocated or zeroed out; and based on the result of the determination being that the extra bits of the at least one uniquely allocated storage region exist and are unallocated or zeroed out, preventing the third snapshot from being created.

16. The non-transitory machine-readable medium of claim 15, wherein the rule is further applicable to identify one or more redundant snapshots associated with the storage object, and send a notification relating to the one or more redundant snapshots directed to a user device associated with the storage object, and wherein the notification of the one or more redundant snapshots is sent to the user device via reporting for the storage object, and enables the one or more redundant snapshots to be deleted, via the user device, to reduce a size of metadata storage associated with the storage object.

17. The non-transitory machine-readable medium of claim 15, wherein the storage object comprises at least one of a volume or a file system.

18. The non-transitory machine-readable medium of claim 15, wherein the operations further comprise using an application programming interface (API) for detection of the uniquely allocated storage regions, wherein the API uses at least one parameter of a group of parameters as input to generate an encoded bitmap comprising the uniquely allocated storage regions, and wherein the group comprises a starting offset, a length, a chunk size of data comprised in the storage object, a base snapshot and a refreshed snapshot.

19. The non-transitory machine-readable medium of claim 15, wherein the result of the determination is the determination that no extra bits and no uniquely allocated storage regions exist, and wherein the operations further comprise, based on the result of the determination being that no extra bits and no uniquely allocated storage regions exist, validating, by the core logical engine, that at least one external snapshot associated with the protection policy exists.

20. The non-transitory machine-readable medium of claim 15, wherein the result of the determination is the determination that the extra bits of the uniquely allocated storage regions exist and are allocated or not zeroed out, and wherein the operations further comprise, based on the result of the determination being that the extra bits of the uniquely allocated storage regions exist and are allocated or not zeroed out, triggering a third creation of the third snapshot.

* * * * *